United States Patent
Firestone et al.

(10) Patent No.: US 11,263,181 B1
(45) Date of Patent: Mar. 1, 2022

(54) SEARCHABLE AND SECURE DECENTRALIZED P2P FILESYSTEM

(71) Applicant: CyLogic, Inc., Chevy Chase, MD (US)

(72) Inventors: Adam Firestone, Alexandria, VA (US); Hilary L. MacMillan, Ashburn, VA (US); Raghu Lingampally, Hyderabad (IN)

(73) Assignee: CyLogic, Inc., Chevy Chase, MD (US)

( * ) Notice: Subject to any disclaimer, the term of this patent is extended or adjusted under 35 U.S.C. 154(b) by 0 days.

(21) Appl. No.: 17/398,313

(22) Filed: Aug. 10, 2021

Related U.S. Application Data

(60) Provisional application No. 63/228,186, filed on Aug. 2, 2021, provisional application No. 63/226,265, filed (Continued)

(51) Int. Cl.
*H04L 29/06* (2006.01)
*G06F 16/182* (2019.01)
(Continued)

(52) U.S. Cl.
CPC ........ *G06F 16/1837* (2019.01); *G06F 16/176* (2019.01); *H04L 9/0825* (2013.01); (Continued)

(58) Field of Classification Search
CPC . G06F 16/1837; G06F 16/176; H04L 9/0825; H04L 9/0866; H04L 9/0894; H04L 9/30; H04L 9/3239
See application file for complete search history.

(56) References Cited

U.S. PATENT DOCUMENTS 7,170,999 B1 * 1/2007 Kessler ............... G06F 21/606
380/201
7,356,531 B1 4/2008 Popelka et al.
(Continued)

OTHER PUBLICATIONS

Brian, et al. "JigDFS: A secure distributed file system." 2009 IEEE Symposium on Computational Intelligence in Cyber Security (2009).

*Primary Examiner* — Shin-Hon (Eric) Chen
(74) *Attorney, Agent, or Firm* — Kasha Law LLC; John R. Kasha; Kelly L. Kasha

(57) ABSTRACT

A first user saving a file f is detected. The file f is intercepted. A filename and one or more text strings entered as searchable metadata are also intercepted. An identifier id(f) is generated for the file f. The filename, the one or more text strings, and id(f) are stored together on a content address server. A symmetric encryption key KF is generated. File f is divided into n segments. An identifier $id(s_i)$ is generated for each segment $s_i$. Each $s_i$ is encrypted using KF, producing n encrypted segments $es_i=ES_{KF}(S_i)$. Each $es_i$ is stored with its $id(s_i)$ on a peer device. For each $es_i$, $id(s_i)$ is stored on the content address server with id(f). A public key KU2 of a second user is retrieved, KF is encrypted with KU2, producing wrapped key KW2 $EA_{KU2}(KF)$, and KW2 is stored on the content address server with id(f).

12 Claims, 8 Drawing Sheets

Related U.S. Application Data on Jul. 28, 2021, provisional application No. 63/226,241, filed on Jul. 28, 2021, provisional application No. 63/170,331, filed on Apr. 2, 2021.

(51) Int. Cl.
*H04L 9/08* (2006.01)
*H04L 9/30* (2006.01)
*H04L 9/32* (2006.01)
*G06F 16/176* (2019.01)

(52) U.S. Cl.
CPC .......... *H04L 9/0866* (2013.01); *H04L 9/0894* (2013.01); *H04L 9/30* (2013.01); *H04L 9/3239* (2013.01)

(56) References Cited

U.S. PATENT DOCUMENTS

| | | | |
|---|---|---|---|
| 7,802,310 | B2 | 9/2010 | Farber et al. |
| 8,001,096 | B2 | 8/2011 | Farber et al. |
| 9,363,247 | B2 | 6/2016 | Murray |
| 9,819,663 | B1* | 11/2017 | Gauda ................. G06F 16/1734 |
| 9,965,483 | B2 | 5/2018 | Beaverson et al. |
| 10,255,340 | B2 | 4/2019 | King, III et al. |
| 2005/0240591 | A1* | 10/2005 | Marceau ................. G06F 16/10 |
| 2016/0065547 | A1* | 3/2016 | Heinrich ................. G06F 16/13 713/171 |
| 2019/0377889 | A1* | 12/2019 | Mertens ................ H04L 9/0825 |
| 2021/0075623 | A1* | 3/2021 | Petersen ............... H04L 9/3247 |
| 2021/0126903 | A1* | 4/2021 | Racz ........................ H04L 9/14 |

* cited by examiner

SEARCHABLE AND SECURE DECENTRALIZED P2P FILESYSTEM

RELATED APPLICATIONS

This application claims the benefit of U.S. Provisional Patent Application Ser. No. 63/226,265, filed on Jul. 28, 2021, the content of which is incorporated by reference herein in its entirety.

INTRODUCTION

The teachings herein relate to a decentralized or distributed filesystem. More particularly the teachings herein relate to systems and methods for storing, searching, retrieving, and sharing searchable files in a peer-to-peer distributed file system using symmetric encryption keys wrapped by asymmetric encryption keys.

The systems and methods herein can be performed in conjunction with a processor, controller, or computer system, such as the computer system of FIG. 1.

Searchable Decentralized File Systems

Distributed, decentralized, or peer-to-peer (P2P) file systems offer many advantages to an enterprise: They improve data durability through the imposition of structured redundancy and defend against denial of availability attacks such as ransomware. They provide significantly greater download speeds than traditional client-server (i.e., hub and spoke) network models. They distribute risk across many nodes and in doing so remove eliminate single points of failure.

Unfortunately, decentralized file systems also present challenges, not the least of which is data discovery or knowledge management. Data is an organization's greatest asset, and the organization's ability to manage knowledge and derive wisdom across the span of its data holdings is critical to success. These barriers are magnified when the contents of the distributed or decentralized file system are cryptographically secured, as described below. Searching and discovery across many devices are difficult due to security and latency issues associated with the need to traverse device and network boundaries, as well as data opacity resulting from encryption. Searching and discovery can be entirely frustrated when cryptographic security measures are combined with distributed or decentralized file systems, rendering content completely opaque to keyword search mechanisms.

As a result, there exists an unmet need for systems and methods that allow searching and discovery when cryptographic security measures are combined with distributed, decentralized, or P2P file systems.

Decentralized File Systems

Modern computer networks have evolved around the notion of information and infrastructure centralization. While this paradigm has offered benefits in terms of physical and information security for data residing on an organization's servers, and a concentration of management resources, it has often been found lacking with respect to data durability and economy of operation. Regarding data durability, centralization creates a single point of failure. If the server or data center is rendered unavailable or inoperable, the organization(s) reliant on the information residing on that physical infrastructure can find themselves without access to their most critical resource. Additionally, the operational costs associated with information technology infrastructure, as well as the skilled professionals required to operate it, are very significant, and often pose a constraint on organizational goals and ambitions.

The response to the conventional paradigm has been the development of the decentralized file system. Decentralized file systems ensure data durability by distributing information between all participants rather than in one central hub that represents a single point of failure. They neutralize denial of availability attacks such as ransomware through the use of content-based addressing instead of conventional location-based addressing that mitigates or eliminates the attackers' return on investment (ROI). Content-based addressing turns all participants into super-nodes that are simultaneously clients and servers, eliminating the need for centralized file management infrastructure, and enabling organizations that embrace decentralization to reduce or eliminate the associated hardware and personnel costs.

Despite their advantages, decentralized file systems have not enjoyed widespread adoption due to the fact that they do not provide adequate information confidentiality. That is, their underlying architecture ensures that all participants have access to all information at all times. This runs contrary to organizational requirements to safeguard data and control access.

Instead, decentralized file systems have primarily be used for public file sharing. For example, BitTorrent is a popular peer-to-peer (P2P) public file-sharing protocol.

FIG. 2 is an exemplary diagram 200 showing how a file is publicly shared by a BitTorrent client application. For example, in order to share file 210 originally located only on client device 201, a BitTorrent client application of client device 201 divides file 210 into q equal length pieces or segments and hashes each segment with a unique cryptographic hash key or hash value, producing q cryptographic hash values. The BitTorrent client application of client device 201 then creates a descriptor file 211, called a torrent, for file 210 that uniquely identifies the file.

A cryptographic hash value is a bit array of fixed size that uniquely and mathematically represents the data of a file, for example. The cryptographic hash value is found from the data of the file using a mathematical algorithm. As a result, a reconstructed file, for example, can be verified by applying the mathematical algorithm to the data of the reconstructed file and then comparing the cryptographic hash value that is produced with the previous cryptographic hash value of the original file.

Descriptor file 211 includes at least two lists. The first list is a list of the q cryptographic hash values corresponding to the q equal length segments. The second list is a list of m tracker devices (servers) that keep track of client devices (peers) that include one or more of the segments of file 210.

To enable sharing of file 210, for example, descriptor file 211 is sent to the m tracker devices (not shown). Since no segments have been shared at this point, each of the m tracker devices is only aware that client device 201 includes all of the segments of file 210.

At time $t_1$, for example, a BitTorrent client application of client device 209 is looking for file 210 and finds file descriptor 211 on one of the m tracker devices or some other server device, or is sent torrent or file descriptor 211 by someone referring the user of client device 209 to file 210. File descriptor 211 additionally includes the filename of file 210 and metadata about file 210. File descriptor 211 can be found on a tracker or another server using a filename or piece of metadata. Using file descriptor 211 and information from the tracker, client device 209 learns that device 201 includes q segments of file 210 and requests all q segments from client device 201 since it is currently the only client to include any segment.

In response, the BitTorrent client application of client device 201 sends all q segments to client device 209. The BitTorrent client application of client device 209 then updates the m tracker devices to let them know that, in addition to client device 201, client device 209 now has a copy of all q segments of file 210. Finally, client device 209 reconstructs file 210 from the q segments of file 210 using the q cryptographic hash values of file descriptor 211.

At a later time $t_2$, for example, a BitTorrent client application of client device 202 is also looking for file 210 and finds file descriptor 211 on one of the m tracker devices. Using file descriptor 211 and information from the tracker, client device 202 learns that both devices 201 and 209 include q segments of file 210. The BitTorrent client application of client device 202 determines the most efficient method of obtaining the q segments of file 210 from devices 201 and 209. For example, client device 202 requests segment 1 from device 201 and segments 2 through q from device 209.

In response, the BitTorrent client application of client device 201 sends segment 1 to client device 202, and client device 209 sends segments 2 through q to client device 202. The BitTorrent client application of client device 202 then updates the m tracker devices to let them know that, in addition to client devices 201 and 209, client device 202 now has a copy of all q segments of file 210. Finally, client device 202 reconstructs file 210 from the q segments of file 210 using the q cryptographic hash values of file descriptor 211.

FIG. 2 illustrates how a file is found and downloaded in BitTorrent using a tracker. In more recent versions of BitTorrent, peers or client devices can locate a torrent directly using a distributed hash table (DHT). A DHT is a lookup service with key-value pairs. In theory, the DHT is decentralized. In practice, it is typically located on one or two servers. To find the location of nearby (in the network sense) client devices that include the desired file, a client device queries the DHT using a hash of the torrent of the desired file. The returned list of client devices is then used to retrieve segments of the file.

Although popular for sharing publicly available information, BitTorrent is not suitable for use as a distributed file system because it lacks facilities for maintaining information confidentiality among users. Tahoe least-authority file store (Tahoe-LAFS) is an exemplary open-source distributed data store that is sometimes described as a distributed file system. Tahoe-LAFS includes a method for maintaining information confidentiality among users FIG. 3 is an exemplary diagram 300 showing how a file is securely stored in Tahoe-LAFS. File 310 is, for example, created on client device 301. Instead of storing file 310 on client device 301, Tahoe-LAFS sends unencrypted file 310 to secure hypertext transfer protocol (HTTPS) server 302 using a secure HTTPS connection to HTTPS server 302. HTTPS server 302 encrypts file 310 and then divides encrypted file 311 into m pieces or segments using erasure coding. Erasure coding allows file 311 to be reconstructed from some number of the m segments that is less than m. Each of the m segments is then distributed to a different server among servers 330.

When client 301 wants to retrieve file 310, it requests the file from HTTPS server 302. HTTPS server 302 then retrieves some number of the m segments that is less than m from servers 330, decodes the segments producing encrypted file 311, and decrypts file 311 producing file 310. File 310 is then returned to client 301 using a secure HTTPS connection from HTTPS server 302.

Tahoe-LAFS securely stores files but is not a P2P system. Instead, Tahoe-LAFS acts like a redundant array of inexpensive disks (RAID) system where servers are used in place of local storage or disk drives. Tahoe-LAFS is therefore not conducive to file sharing among client devices.

Cleversafe is another distributed data store that can be used as a distributed file system. Like Tahoe-LAFS, Cleversafe divides encrypted files into m pieces or segments using erasure coding and stores the segments on different servers. Additionally, Cleversafe uses unique object identifiers (IDs) to identify each file in the system. This allows Cleversafe to store files in a flat-file system rather than in a tree-like hierarchical structure, which is most commonly used by traditional file systems. A flat file system can allow more data to be stored.

Unfortunately, also like Tahoe-LAFS, Cleversafe is not a P2P system. It is again more similar to a RAID system, where servers are used in place of local storage or disk drives. It is, therefore, less useful for sharing files.

Further, Bian, J. and R. Seker. "JigDFS: A secure distributed file system." 2009 *IEEE Symposium on Computational Intelligence in Cyber Security* (2009): 76-82 (hereinafter the "Bian Paper") describes another problem with Tahoe-LAFS and Cleversafe. The Bian Paper suggests that the lack of anonymity or deniability in systems like Tahoe-LAFS and Cleversafe makes them less useful in commercial or business settings. For example, the use of central servers in Tahoe-LAFS and Cleversafe make it easier to track the owners or editors of certain files. As a result, it would be possible, for example, to link a file for anonymous feedback to its editors in these systems.

In response to this problem, the Bian Paper proposes the jigsaw distributed file system (JigDFS). JigDFS is a secure P2P distributed file system. According to the Bian Paper, the use of a fully P2P distributed system "eliminates the possible leakage of user information from a central server."

FIG. 4 is an exemplary diagram 400 showing how a file is securely stored in JigDFS. File 410 is, for example, created on client device 401. In order to save file 410, a client application of JigDFS on client device 401 prompts the user of client device 401 for a password, p, for file 410. The client application hashes p with a hash algorithm to produce hash value h(p). The client application then encrypts file 410 using the hash value h(p), producing encrypted file 411. The client application divides encrypted file 411 into n slices or segments using erasure coding. The client application also hashes hash value h(p) using the hash algorithm to produce hash value h(h(p)).

The client application of JigDFS on client device 401 sends each segment of the n segments to one of n different client devices 420. Along with each segment, the client application sends the hash value h(h(p)). In other words, the client application sends a segment and hash value pair to each client device of client devices 420.

A hash value is sent along with each segment because JigDFS uses a hashed-key chain algorithm to create a hierarchy tree for each file. In other words, JigDFS further segments the segments of a file in each level or layer of a hierarchy of client devices. Each subsequent layer of client devices stores segments of file segments stored in a previous layer. At each layer, segments of a layer segment are encrypted using the hash value sent with the layer segment.

Consequently, for example, segment 412 of the encrypted file is sent to client device 422 along with hash value h(h(p)). In turn, the client application of JigDFS on client device 422 encrypts segment 412 using hash value h(h(p)), producing doubly encrypted segment 413. The client application divides doubly encrypted segment 413 into m slices or segments using erasure coding. The client application also hashes hash value h(h(p)) using the hash algorithm to produce hash value h(h(h(p))).

The client application of JigDFS on client device 422 sends each segment of the m segments to one of m different client devices 440 in the next layer of client devices. Along with each segment, the client application sends the hash value h(h(h(p))).

This iterative segmenting of file segments continues until a desired file security level (FSL) is reached. Like the password, p, that starts the hierarchy of hash values, the FSL (not shown) is specified or input by the user who saves file 410 on client device 401.

Like BitTorrent, JigDFS can retrieve a file using a DHT. A hash value of each file, h(f, is stored with each segment of the file in the file indexing DHT. When a user requests the file using h(f, the file segments are retrieved from the bottom layer of the hierarchical tree of client devices and sent to the user's client device along routes described by the DHT. Eventually, the user's client device will receive enough segments to recover the encrypted file. The user will then enter the password, p, again to decrypt the reconstructed file using h(p).

Ultimately, sharing a file in JigDFS requires sharing the password, p, of the file. This can provide anonymity since it is not possible to determine the user of the password. It also, however, means that the confidentiality of any file is dependent on the confidentiality of the password. In other words, if the password ends up in the wrong hands, the file system has been breached and there is no way to identify who breached the system. In addition, strong passwords are notoriously difficult to remember and, therefore, often end up being saved using unsecure methods or systems such as an unsecure file.

U.S. Pat. No. 9,363,247 (hereinafter the "'247 Patent") is directed to a method of securely storing blocks of a file across many different storage resources of a computer cluster or cloud system. In the method of '247 Patent, an unencrypted file is saved by sending the unencrypted file to a computer cluster using a secure connection, as is done in Tahoe-LAFS. A computing resource of the computer cluster then divides the file into n blocks, generates a different symmetric key for each block, and then encrypts each block using its symmetric key.

The computing resource of the computer cluster can save each encrypted block of the n blocks on a different storage resource of the computer cluster. Along with each encrypted block, the computer resource stores an encrypted version of the symmetric key used to encrypt the block. The symmetric key is encrypted using a symmetric user key. This encrypting of a key with another key can be referred to as keywrapping.

In the method of the '247 Patent, a user obtains a user key from a key manager that is separate from but securely connected to the computer cluster or as part of the computer cluster. A user obtains a user key to store or gain access to a file. When a file is stored, the symmetric key of each encrypted block is encrypted with a user key of the user storing the file, and the wrapped key is stored with the encrypted block.

If the file is to be shared among a group of k users including the user saving the file, for example, the computer resource of the computer cluster encrypts the symmetric key of each encrypted block with each of the user keys of the k users, producing k wrapped keys. The computer resource reconstructs the file for a user of the group of k users by first decrypting the wrapped key for the user of each encrypted block, producing the symmetric key for each encrypted block. Each encrypted block is then decrypted, and the decrypted blocks are reconstructed to produce the file for the user.

The method of the '247 Patent describes using a semi-trusted client threat model. Essentially, this means that a user is authenticated using the secure connection to the computer cluster. As a result, the user can obtain the symmetric user key from the key manager and be verified via the secure connection.

The '247 Patent provides an improvement over JigDFS by allowing files to be shared without having to share a password. However, the use of the secure connection in the method of the '247 Patent to obtain symmetric user keys from a key manager makes the key wrapping technique of the '247 Patent unsuitable for a P2P distributed file system. In other words, relying on a secure connection between all peers in a P2P system in order to authenticate user keys significantly increases the complexity of the system. It also provides point of failure and attack.

SUMMARY

Systems and methods are disclosed for sharing a file with searchable metadata among peer devices in a distributed cryptographically secured P2P filesystem and for finding a file with metadata matching a search term in a distributed cryptographically secured P2P filesystem. A system for sharing a file with searchable metadata among peer devices in a distributed cryptographically secured P2P filesystem includes a public-key server, a content address server, and a first peer device.

The public key server stores one or more public keys of an asymmetric cryptographic algorithm for one or more users. The content address server stores information about one or more files.

The first peer device detects that a first user is saving a file f on the first peer device. The first peer device intercepts the file f before storage in a non-volatile memory of the first peer device. The first peer device also intercepts a filename n of the file f and one or more text strings entered by the first user as searchable metadata for the file f.

The first peer device generates a unique identifier id(f) for the file f. The first peer device stores together the filename n, the one or more text strings, and the identifier id(f) on the content address server. The first peer device divides the file f into n segments. The first peer device generates a unique identifier $id(s_i)$ for each segments $s_i$ of the n segments. The first peer device generates a symmetric encryption key KF for encrypting the n segments. The first peer device encrypts each of the n segments using the symmetric key KF using a symmetric encryption algorithm, producing n encrypted segments.

The first peer device stores each encrypted segment $es_i$ of the n segments with its identifier $id(s_i)$ on at least one peer device identified by a unique peer identifier $l_i$. For each encrypted segment $es_i$, the first peer device stores the identifier $id(s_i)$ on a content address server with the identifier id(f). Finally, the first peer device retrieves from a public key server a public key KU2 of a second user who can share the file f, encrypts the symmetric key KF with the public key KU2 using an asymmetric encryption algorithm, producing wrapped key KW2 $EA_{KU2}(KF)$, and stores the wrapped key KW2 on the content address server with the identifier id(f).

A system for finding a file with metadata matching a search term in a distributed cryptographically secured P2P filesystem includes a content address server and a second peer device. The second peer device intercepts one or more search terms entered by a second user of the second peer device into a file search agent of an operating system of the second peer device. The second peer device queries the content address server with the one or more search terms and a userid $u_2$ of the second user.

The second peer device receives from the content address server for at least one search term of the one or more search terms and the userid $u_2$ a filename n of a file f. The filename n of the file f is found if the at least one search term matches the filename n and the filename n is associated with the userid $u_2$. Alternatively, the filename n of the file f is found if at least one text string of searchable metadata that is associated with the filename n and a unique identifier id(f) of the file f matches the at least one search term and the filename n is associated with the userid $u_2$. In addition to receiving the filename n from the content address server, the second peer device also receives the identifier id(f), at least one wrapped key KW2 associated with the userid $u_2$ for the identifier id(f), and a unique identifier $id(s_i)$ and at least one peer identifier $l_i$ for each encrypted segment $es_i$ of n encrypted segments of the file f.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
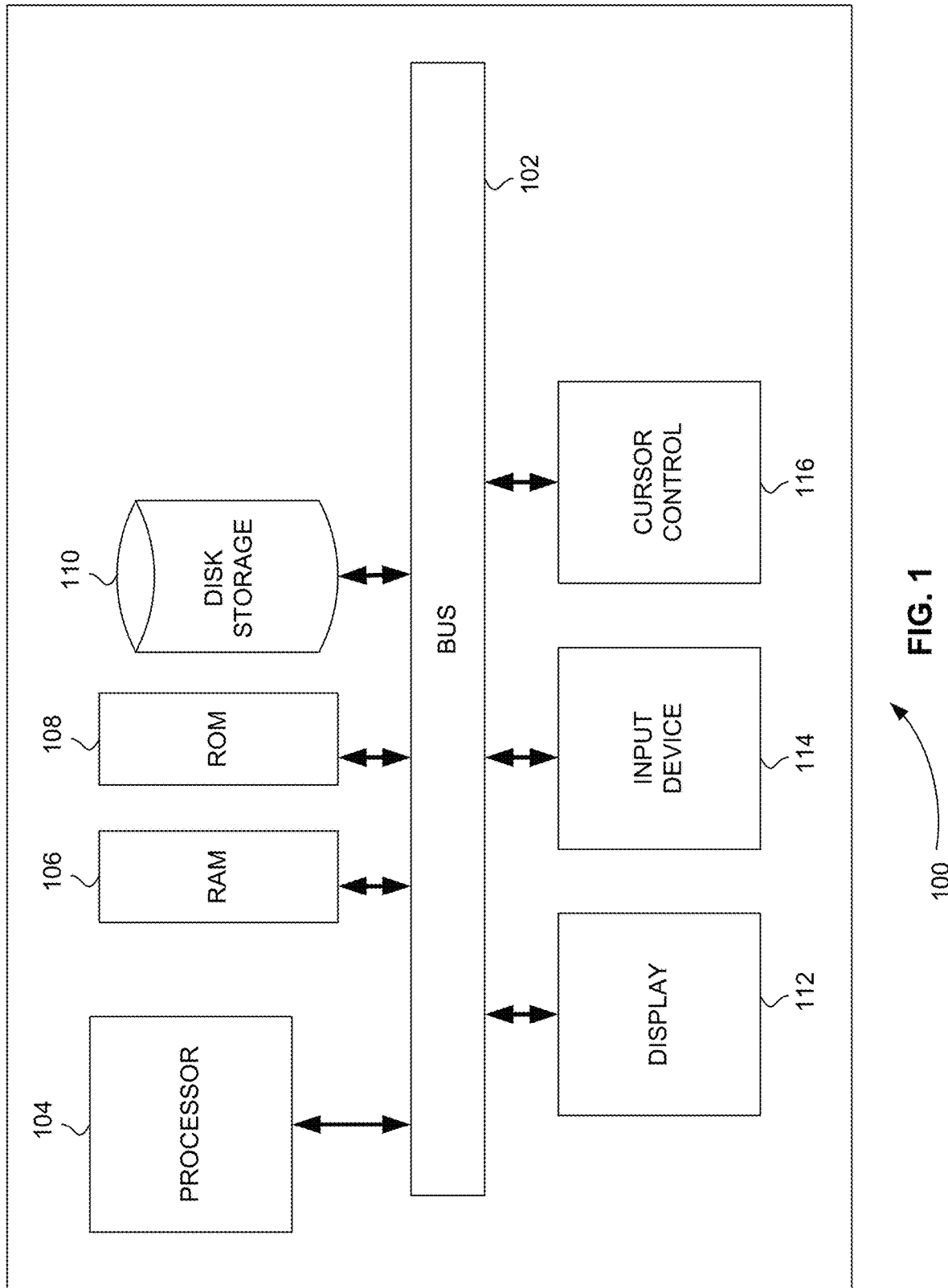
FIG. 1 is a block diagram that illustrates a computer system, upon which embodiments of the present teachings may be implemented.
Figure 2:
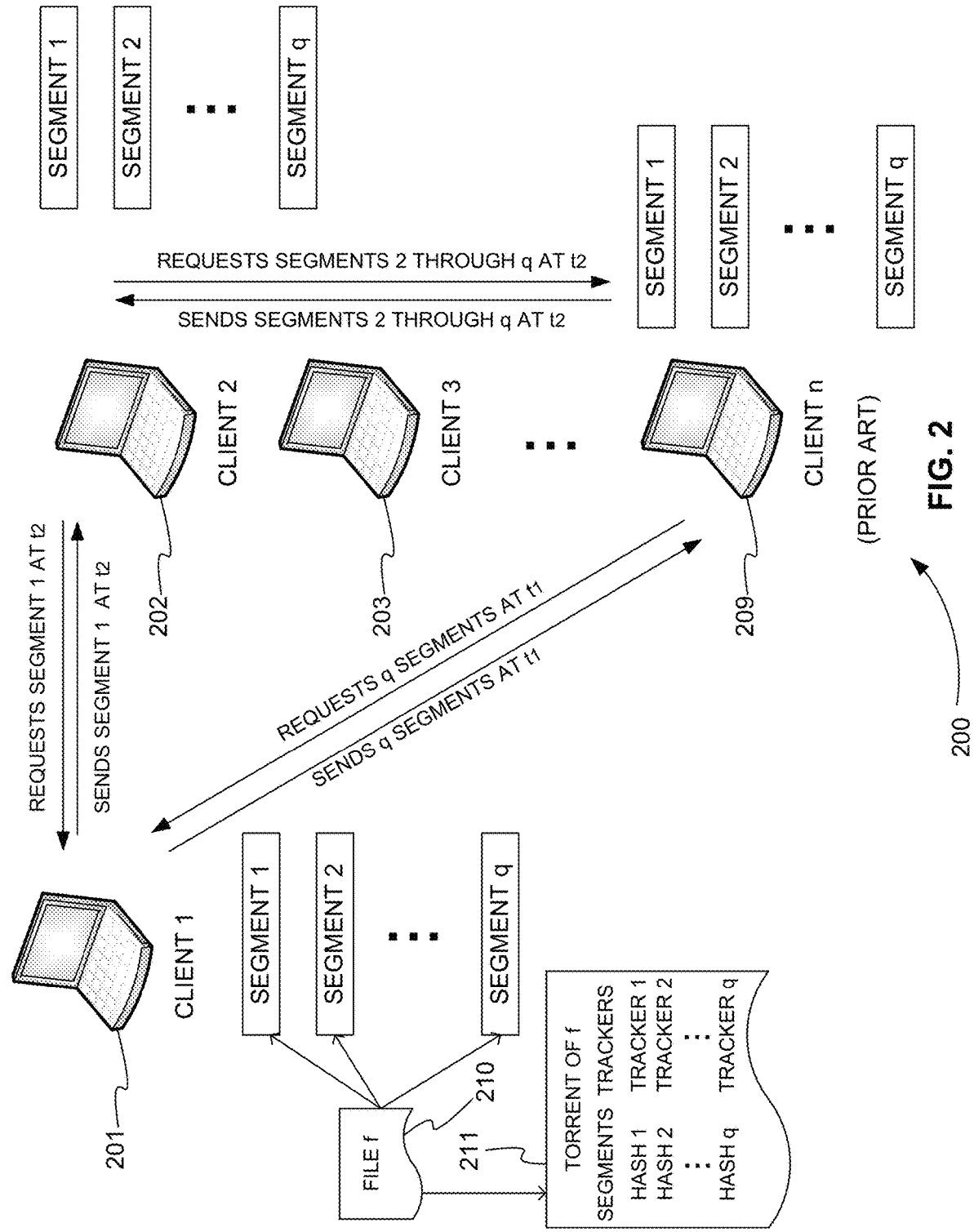
FIG. 2 is an exemplary diagram showing how a file is publicly shared by a BitTorrent client application.
Figure 3:
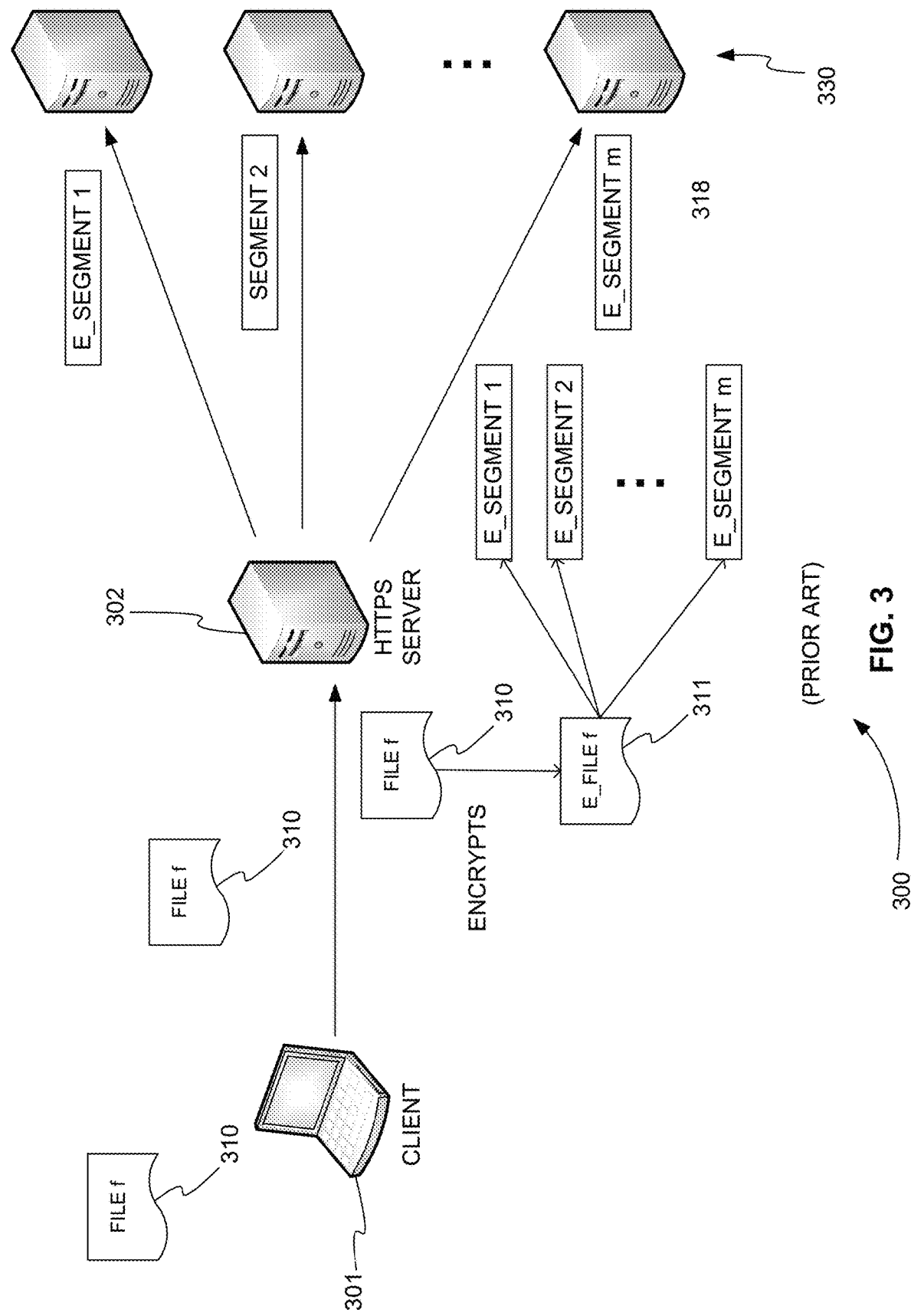
FIG. 3 is an exemplary diagram showing how a file is securely stored in Tahoe-LAFS.
Figure 4:
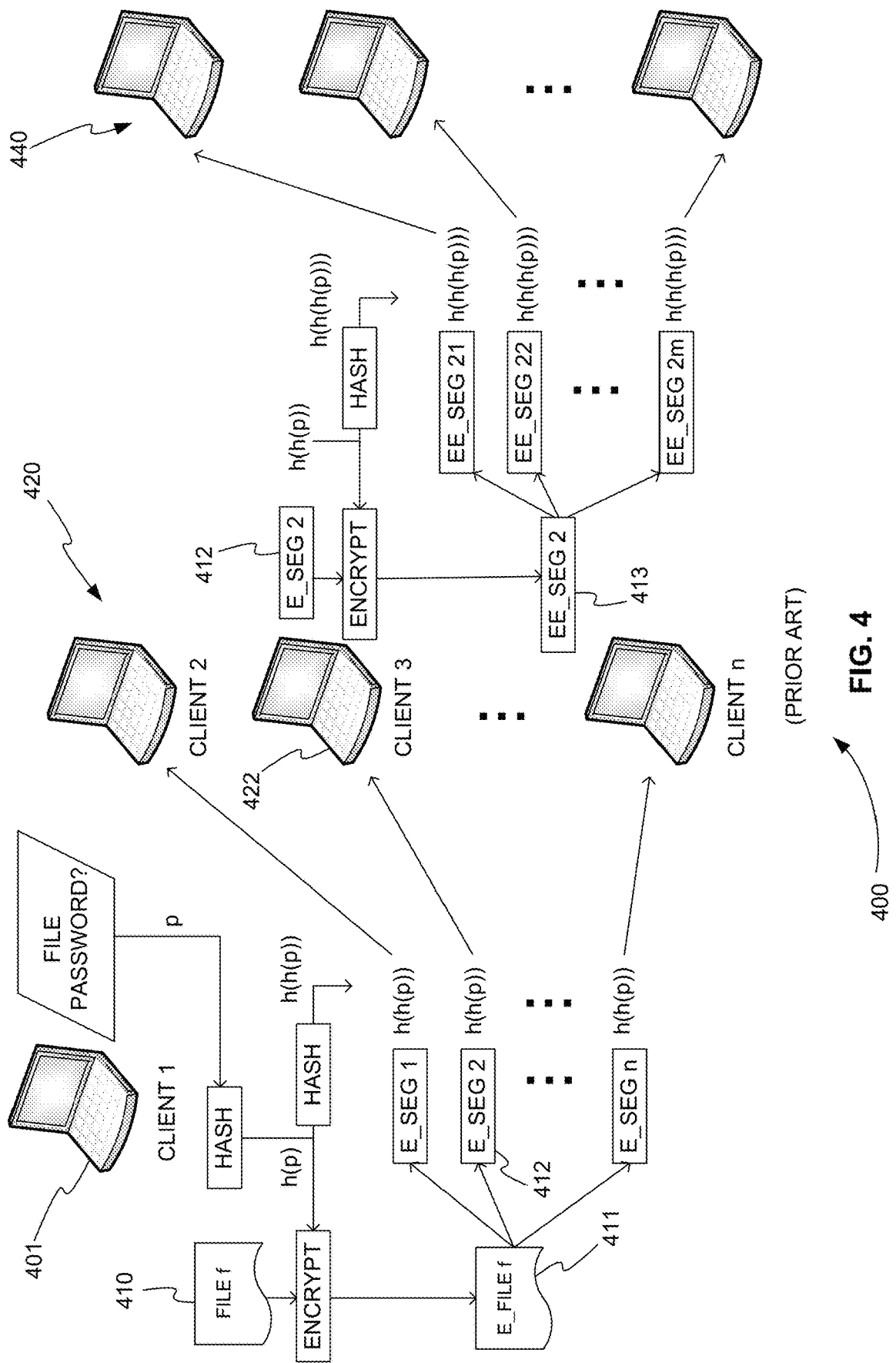
FIG. 4 is an exemplary diagram showing how a file is securely stored in JigDFS.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

The term "computer-readable medium" or "computer program product" as used herein refers to any media that participates in providing instructions to processor 104 for execution. The terms "computer-readable medium" and "computer program product" are used interchangeably throughout this written description. Such a medium may take many forms, including but not limited to, non-volatile media, volatile media, and precursor ion mass selection media. Non-volatile media includes, for example, optical or magnetic disks, such as storage device 110. Volatile media includes dynamic memory, such as memory 106.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Storing and Searching Metadata in a Distributed, Encrypted P2P System

As described above, distributed, decentralized, or peer-to-peer (P2P) file systems offer many advantages to an enterprise. Unfortunately, decentralized file systems also present challenges, not the least of which is data discovery or knowledge management.

Data is an organization's greatest asset, and the organization's ability to manage knowledge and derive wisdom across the span of its data holdings is critical to success. These barriers are magnified when the contents of the distributed or decentralized file system are cryptographically secured, as described below. Searching and discovery across many devices are difficult due to security and latency issues associated with the need to traverse device and network boundaries, as well as data opacity resulting from encryption. Searching and discovery can be entirely frustrated when cryptographic security measures are combined with distributed or decentralized file systems, rendering content completely opaque to keyword search mechanisms.

As a result, there exists an unmet need for systems and methods that allow searching and discovery when cryptographic security measures are combined with distributed, decentralized, or P2P file systems.

In various embodiments, systems and methods described herein allow searching and discovery when cryptographic security measures are combined with distributed, decentralized, or P2P file systems. This is qualitatively different from how other distributed, decentralized, or P2P file systems have stored and searched files. In various embodiments, the files described herein consist of an encrypted payload, e.g., the file content, and searchable metadata that is moved around by the content server, enabling distributed search on encrypted data.

System for Sharing a Searchable File

Figure 5:
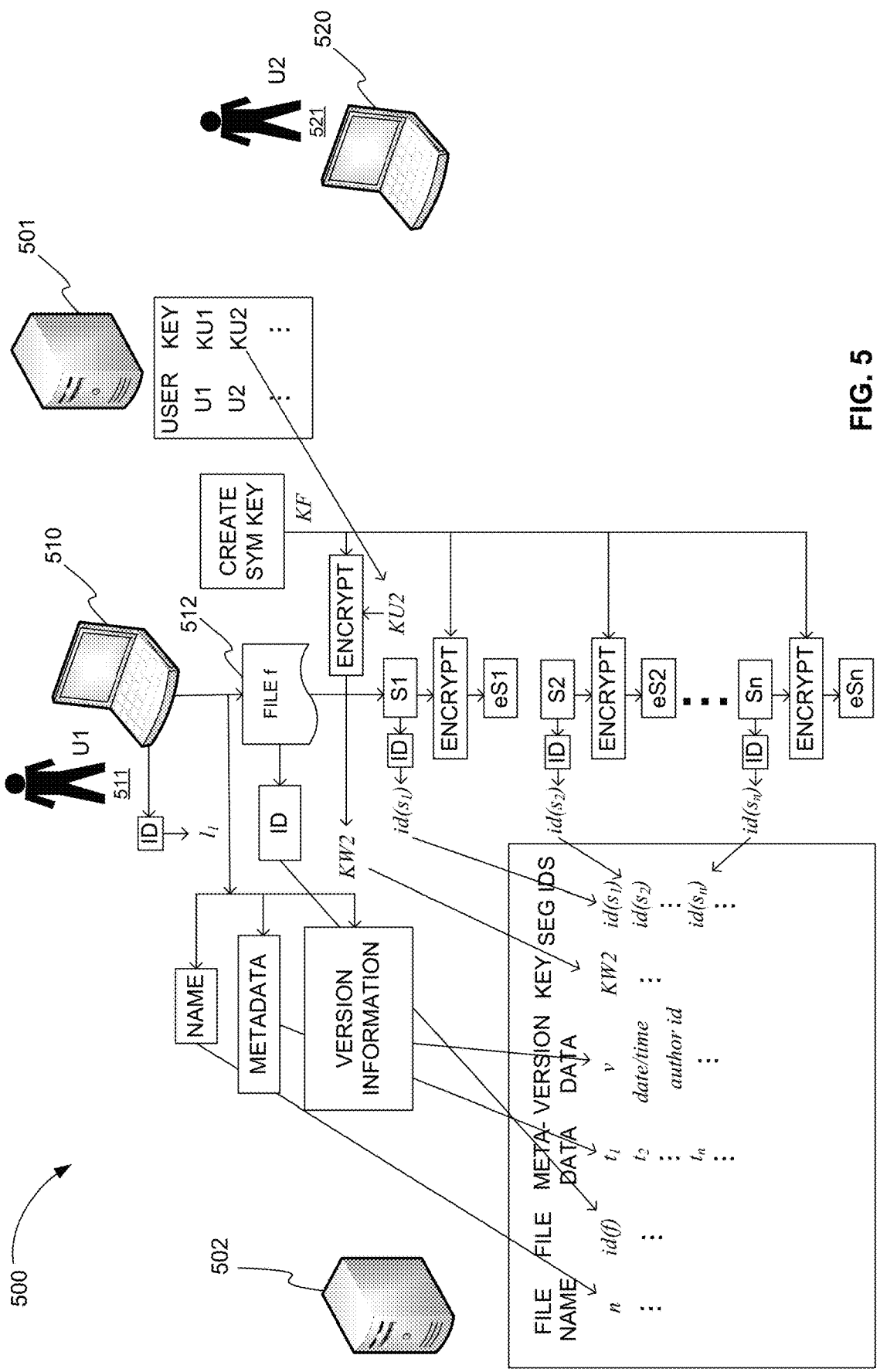
FIG. 5 is an exemplary diagram showing a system for sharing a file with searchable metadata among peer devices in a distributed cryptographically secured P2P filesystem, in accordance with various embodiments.

FIG. 5 is an exemplary diagram 500 showing a system for sharing a file with searchable metadata among peer devices in a distributed cryptographically secured P2P filesystem, in accordance with various embodiments. The system of FIG. 5 includes public-key server 501, content address server 502, and first peer device 510.

Public key server 501 stores one or more public keys of an asymmetric cryptographic algorithm for one or more users. Public key server 501 can be a computer service residing on any type of computer system including, but not limited to, the computer system of FIG. 1.

Content address server 502 stores information about one or more files. Like public key server 501, content address server 502 can be a computer service residing on any type of computer system including, but not limited to, the computer system of FIG. 1.

First peer device 510 is a computer system of the distributed P2P filesystem that is used for sharing files or segments of files. A peer device is typically a client computing device, such as a laptop computer, desktop computer, tablet computer, or smartphone, but can be any type of computing device that executes a client application for sharing files in the distributed P2P file system. A peer device, for example, can be the computer system of FIG. 1.

When, for example, a first user 511 saves a file f 512, first peer device 510 performs several steps using a client application (not shown) of the distributed P2P filesystem that resides on first peer device 510. The client application is, for example, a file monitoring agent. First peer device 510 detects that first user 511 is saving file f 512 on first peer device 510. First peer device 510 intercepts file f 512 before storage in a non-volatile memory of first peer device 510. First peer device 510 also intercepts a filename n of file f 512 and one or more text strings $(t_1, \ldots, t_n)$ entered by first user 511 as searchable metadata for file f 512.

First peer device 510 generates a unique identifier id(f) for file f 512. First peer device 510 stores together the filename n, the one or more text strings, and the identifier id(f) on content address server 502.

First peer device 510 divides file f 512 into n segments. First peer device 510 generates a unique identifier $id(s_i)$ for each segment $s_i$ of the n segments. First peer device 510 generates a symmetric encryption key KF for encrypting the n segments. First peer device 510 encrypts each of the n segments using the symmetric key KF using a symmetric encryption algorithm, producing n encrypted segments. First peer device 510 stores each encrypted segment $es_i$ of the n segments with its identifier $id(s_i)$ on at least one peer device identified by a unique peer identifier $l_i$. In various embodiments and as shown in FIG. 5, the n encrypted segments are stored on first peer device 510, which is location $l_1$. For each encrypted segment $es_i$, first peer device 510 stores the identifier $id(s_i)$ on content address server 502 with the identifier id(f). Note that the storage of the filename n, the one or more text strings, and the identifier id(f) on content address server 502 and the storage of the n encrypted segments on a peer device provides a unique file format in which there is metadata+payload but where metadata and payload can be geographically distributed from one another at any given point in time.

Finally, first peer device 510 retrieves from public key server 501 a public key KU2 of second user 521 who can share file f 512, encrypts the symmetric key KF with the public key KU2 using an asymmetric encryption algorithm, producing wrapped key $KW2=EA_{KU2}(KF)$, and stores the wrapped key KW2 on content address server 502 with the identifier id(f), for example. First peer device 510 can also or alternatively, for example, store the wrapped key KW2 on first pear device 510. Essentially, the information stored on content address server 502 for the identifier id(f) makes file f 512 sharable by second user 521 using second peer device 520.

In various embodiments, first peer device 510 stores versioning information with the filename n, the one or more text strings, and the identifier id(f) on content address server 502. Specifically, first peer device 510 searches content address server 502 for previous versions of file f 512 using the filename n and the identifier id(f). First peer device 510 generates versioning information for the file f from the search. First peer device 510 then stores together the filename n, the one or more text strings, the versioning information, and the identifier id(f) on content address server 502.

In various embodiments, the versioning information includes a date and time of the storage of the file f 512, a userid of an author of file f 512, and an ordinal sequence number v of the version.

In various embodiments, content address server 502 can be a distributed hash table. The identifier id(f) is then a cryptographic hash value h(f) and is generated using a cryptographic hashing algorithm. Also, the unique identifier $id(s_i)$ for each segment $s_i$ of the n segments is a cryptographic hash value $h(s_i)$ and is generated using the cryptographic hashing algorithm.

In various embodiments, first peer device 510 further notifies second peer device 520 of file f 512. For example, first peer device 510 sends the identifier id(f) to second peer device 520 used by second user 521 to let second user 521 know that file f 512 is available.

In various embodiments, first peer device 510 sends the identifier id(f) to second peer device 520 that the P2P filesystem application of second peer device 520 stores in the form of a symbolic link. Similarly, first peer device 510 can also send the wrapped key KW2 for second user 521 with identifier id(f) to second peer device 520. The P2P filesystem application of second peer device 520 then also stores the wrapped key KW2 for second user 521 in the symbolic link. In other words, to second user 521 of second peer device 520, file f 512 appears as any other file in the filesystem of second peer device 520 even though none of the segments of file f 512 may currently be stored on second peer device 520.

In addition or alternately, if content address server 502 is a distributed hash table, when first peer device 510 stores the identifier id(f) on content address server 502 second peer device 520 is automatically notified of file f 512. For example, content address server 502 automatically publishes an update to the distributed hash table accessible to second peer device 520 when file f 512 is added. Second peer device 520 can also be automatically notified of the wrapped key KW2 for second user 521 for file f 512.

In various embodiments, first peer device 510 does not initially store the n encrypted segments, $es_i$, of file f 512 on any other peers. All of the n encrypted segments are only stored on another peer after that peer has received the identifier id(f) of file f 512 and opened the file. Opening the file on another peer, for example, causes the n encrypted segments, $es_i$, of file f 512 to be transmitted to and received by that peer from one or more other peers.

In various embodiments, first peer device 510 stores segments across different peer devices. Specifically, first peer device 510 stores each segments, of then segments with its identifier $id(s_i)$ on a different peer device identified by a unique peer identifier $l_i$.

In various embodiments, redundancy is provided in segments stored across different peer devices using erasure coding. Specifically, first peer device 510 divides file f 512 using erasure coding so that file f 512 can be reconstructed from m segments of the n segments where m<n.

In various embodiments, content address server 502 stores a wrapped key with a file identifier for each user that can share the file. For example, a wrapped key for first user 511 also needs to be stored with identifier id(f) so that first user 511 can reconstruct file f 512. Specifically, first peer device 510 further retrieves from public key server 501 a public key KU1 of first user 511, encrypts the symmetric key KF with the public key KU1 using the asymmetric encryption algorithm, producing wrapped key $KW1=EA_{KU1}(KF)$, and stores the wrapped key KW1 on content address server 502 with the identifier id(f).

In various embodiments, content address server 502 additionally stores a user identifier (userid) with each wrapped key. Additionally or alternatively, each wrapped key can be stored on a peer device along with the file identifier.

System for Finding a File Using a Search Term

Figure 6:
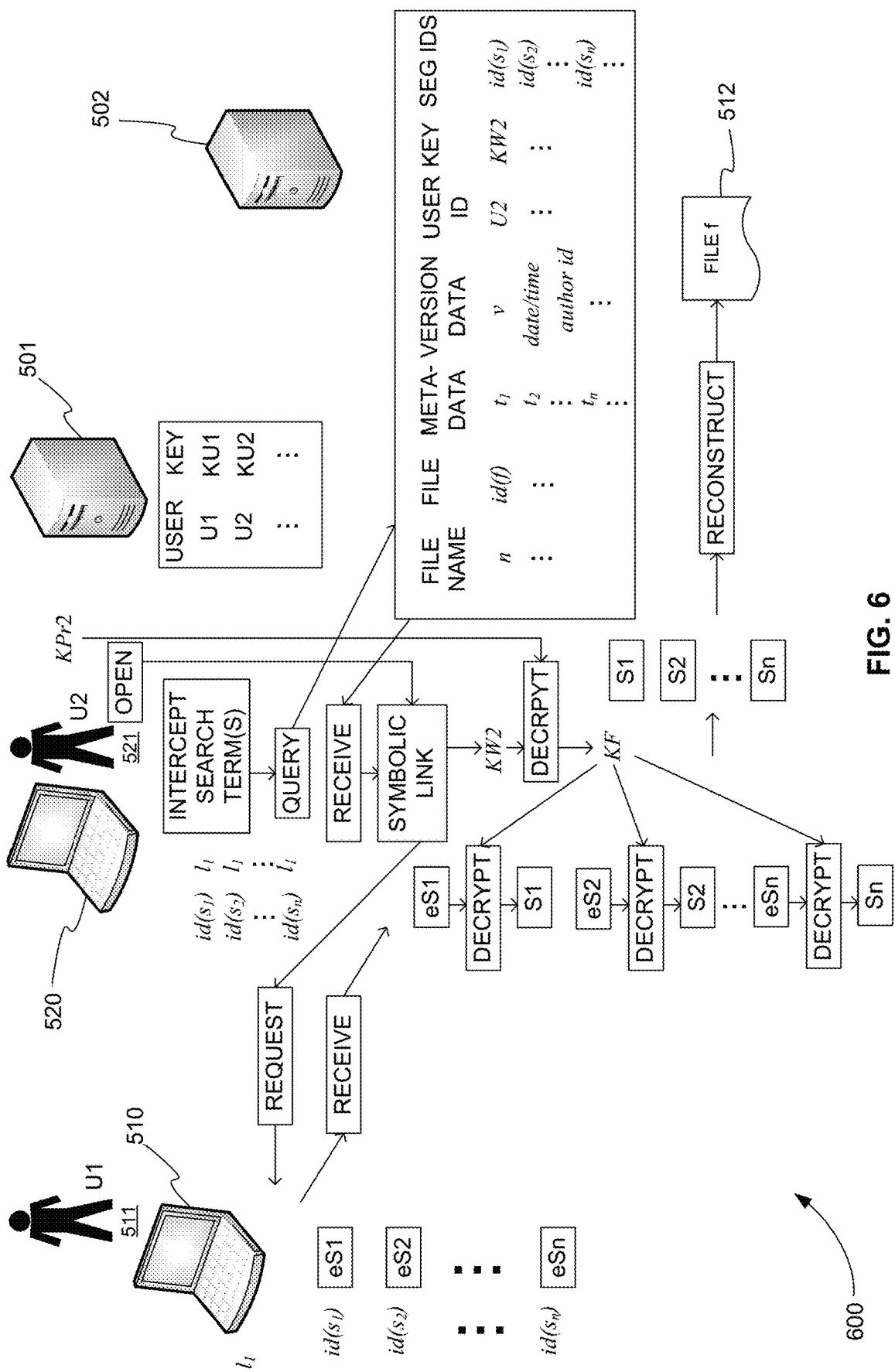
FIG. 6 is an exemplary diagram showing a system for finding a file with metadata matching a search term in a distributed cryptographically secured P2P filesystem

FIG. 6 is an exemplary diagram 600 showing a system for finding a file with metadata matching a search term in a distributed cryptographically secured P2P filesystem, in accordance with various embodiments. The system of FIG. 6 includes public-key server 501, content address server 502, and second peer device 520. These devices are also shown in FIG. 5.

Note that in FIGS. 5 and 6 and as described herein, file identifiers, segment identifiers, and wrapped keys are shown and described as being stored on one content address server 502. In various alternative embodiments, file identifiers, segment identifiers, and wrapped keys can be stored separately or in any combination on separate servers. For example, file and segment identifiers may be stored in a DHT and wrapped keys with a file identifier may be stored in a separate key server.

Second peer device 520 intercepts one or more search terms entered by a second user 521 of second peer device 520 into a file search agent (not shown) of an operating system of second peer device 520. Second peer device 520 queries content address server 502 with the one or more search terms and a userid $u_2$ of second user 521.

Second peer device 520 receives from content address server 502, for at least one search term of the one or more search terms and the userid $u_2$, a filename n of file f 512. The filename n of a file f 512 is found if the at least one search term matches the filename n and the filename n is associated with the userid $u_2$. Alternatively, the filename n of a file f 512 is found if at least one text string of searchable metadata that is associated with the filename n and a unique identifier id(f) of file f 512 matches the at least one search term and the filename n is associated with the userid $u_2$. In other words, the at least one search term is compared to the filename n, the metadata text strings, or both. In various embodiments, the userid $u_2$ is sent along with the at least one search term to ensure that only files accessible to second user 521 are returned. In addition to receiving the filename n from content address server 502, second peer device 520 also receives the identifier id(f), at least one wrapped key KW2 associated with the userid $u_2$ for the identifier id(f), and a unique identifier $id(s_i)$ and at least one peer identifier $l_i$ for each encrypted segment $es_i$ of n encrypted segments of file f 512.

In various embodiments, the metadata text strings are stored with the filename n. Note, however, that the filename n can have different versions and, therefore, more than one identifier id(f). As a result, in various alternative embodiments, metadata text strings are stored with each identifier id(f) of file f 512.

In various embodiments, second peer device 520 stores the filename n, the identifier id(f), the at least one wrapped key KW2 associated with the userid $u_2$ for the identifier id(f), and a unique identifier id($s_i$) and at least one peer identifier $l_i$ for each encrypted segment $es_i$ of n encrypted segments of file f 512 in the form of a symbolic link on second peer device 520.

In various embodiments, the filename n of a file f 512 is found if versioning information associated with the filename n and a unique identifier id(f) of file f 512 matches the at least one search term and the filename n is associated with the userid $u_2$. In other words, the at least one search term is compared to versioning information in addition to the filename n and the metadata text strings.

In various embodiments, the versioning information includes a date and time of the storage of the file f 512, a userid of an author of file f 512, and an ordinal sequence number v of the version. In various embodiments, a userid of an author or editor of file f 512 can also be stored in the metadata text strings or alternatively can be stored in the metadata text strings.

In various embodiments, second peer device 520 receives a request from second user 521 to open the file f 512. In various embodiments and as shown in FIG. 6, the request is invoked by selecting the symbolic link. Second peer device 520 requests each encrypted segment $es_i$ identified by each received identifier id($s_i$) of at least m identifiers of the n encrypted segments, where m<n, using a location of a peer device identified by the at least one peer identifier $l_i$ of each encrypted segment $es_i$.

As shown in FIG. 6, the file f 512 has only just been created by first user 511, for example, and, therefore, the n encrypted segments only reside on first peer device 510, which has peer identifier $l_i$. As a result, second peer device 520 receives from content address server 502 the list of n encrypted segments all associated with the peer identifier $l_i$. As a result, the n segments are requested from first peer device 510 in this example.

Second peer device 520 receives the requested m segments from the request. Second peer device 520 reconstructs or recreates file f 512 from the received m encrypted segments.

In various embodiments and as shown in FIG. 6, m segments can equal n segments. As a result, second peer device 520 reconstructs file f 512 from all n encrypted segments.

Second peer device 520 decrypts the received at least one wrapped key KW2 with a private key KPr2 of second user 521 using an asymmetric encryption algorithm. Symmetric key KF=$EA_{KPr2}^{-1}$(KW2) is produced. Second peer device 520 decrypts each of the n encrypted segments using the symmetric key KF. In various embodiments, there is an error checking component at each stage. For example, if a decryption fails, the process is aborted and the encrypted segment is obtained from another peer.

Finally, second peer device 520 reconstructs file f 512 from the n decrypted segments. Reconstruction has an error checking component as well—if the identifier of each decrypted segment does not match the contents of the segment, there is an attempt to retrieve the segment from a different peer, if the retrieval fails, the process is aborted.

Similarly, the assembled file is error checked and either approved or the process aborted.

Again, as described above and in various embodiments, content address server 502 can be a distributed hash table. The identifier id(f) is then a cryptographic hash value h(f) and is generated using a cryptographic hashing algorithm. In various embodiments, content address server 502 further generates a hash value for the file fusing the cryptographic hashing algorithm and compares the hash value to h(f) to verify the file f 512.

Also, the unique identifier id($s_i$) for each segments, of the n segments is a cryptographic hash value h($s_i$) and is generated using the cryptographic hashing algorithm. In various embodiments, content address server 502 further after decrypting each encrypted segment $es_i$ of the m received encrypted segments, generates a hash value for each decrypted segment $s_i$ using the cryptographic hashing algorithm and comparing the hash value to h($s_i$) to verify each decrypted segment $s_i$.

In various embodiment, second peer device 520 reconstructs encrypted file f 513 using m segments of the n segments where m<n using erasure decoding. In other words, if all n segments are created using erasure coding, then only a subset m of the segments needs to be used to reconstruct file f 512.

Method for Sharing a File

Figure 7:
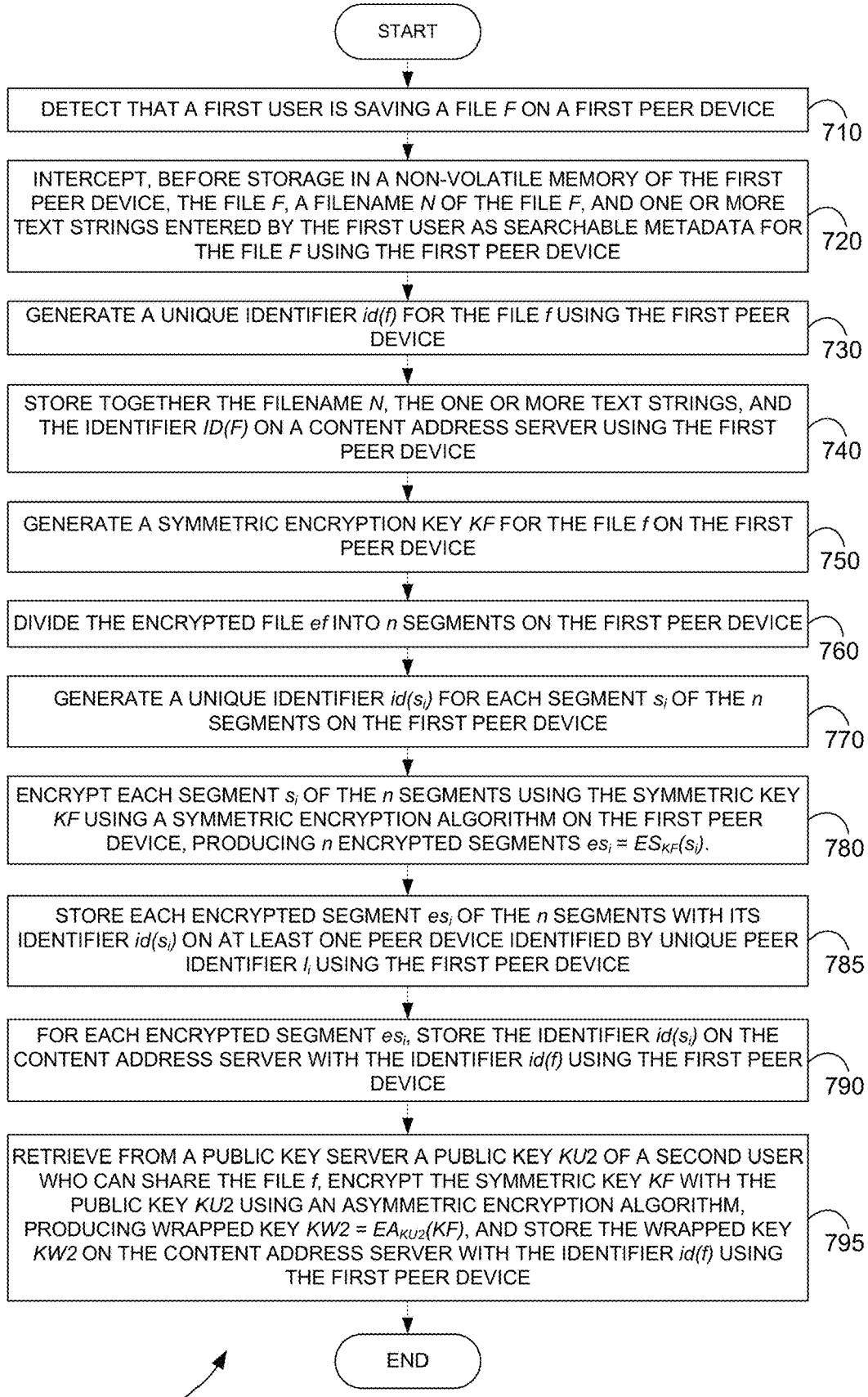
FIG. 7 is a flowchart showing a computer-implemented method for sharing a file with searchable metadata among peer devices in a distributed cryptographically secured P2P filesystem, in accordance with various embodiments.

FIG. 7 is a flowchart showing a computer-implemented method 700 for sharing a file with searchable metadata among peer devices in a distributed cryptographically secured P2P filesystem, in accordance with various embodiments.

In step 710 of method 700, it is detected that a first user is saving a file f on a first peer device.

In step 720, before storage in a non-volatile memory of the first peer device, the file f, a filename n of the file f, and one or more text strings entered by the first user as searchable metadata for the file f are intercepted using the first peer device.

In step 730, a unique identifier id(f) for the file f is generated using the first peer device.

In step 740, store together the filename n, the one or more text strings, and the identifier id(f) on a content address server using the first peer device;

In step 750, a symmetric encryption key KF is generated for the file f on the first peer device.

In step 760, the file f is divided into n segments on the first peer device.

In step 770, a unique identifier id(s) is generated for each segment $s_i$ of the n segments on the first peer device In step 780, each segment $s_i$ of the n segments is encrypted using the symmetric key KF using a symmetric encryption algorithm on the first peer device, producing n encrypted segments $es_i$=$ES_{KF}(S_i)$.

In step 785, each encrypted segment $es_i$ of the n segments is stored with its identifier id($s_i$) on at least one peer device identified by a unique peer identifier $l_i$ using the first peer device.

In step 790, for each encrypted segment $es_i$, the identifier id($s_i$) is stored on the content address server with the identifier id(f) using the first peer device.

In step 795, a public key KU2 of a second user who can share the file f is retrieved from a public key server. The symmetric key KF is encrypted with the public key KU2 using an asymmetric encryption algorithm, producing wrapped key KW2=$EA_{KU2}$(KF). The wrapped key KW2 is stored on the content address server with the identifier id(f) using the first peer device.

Method for Finding a File

Figure 8:
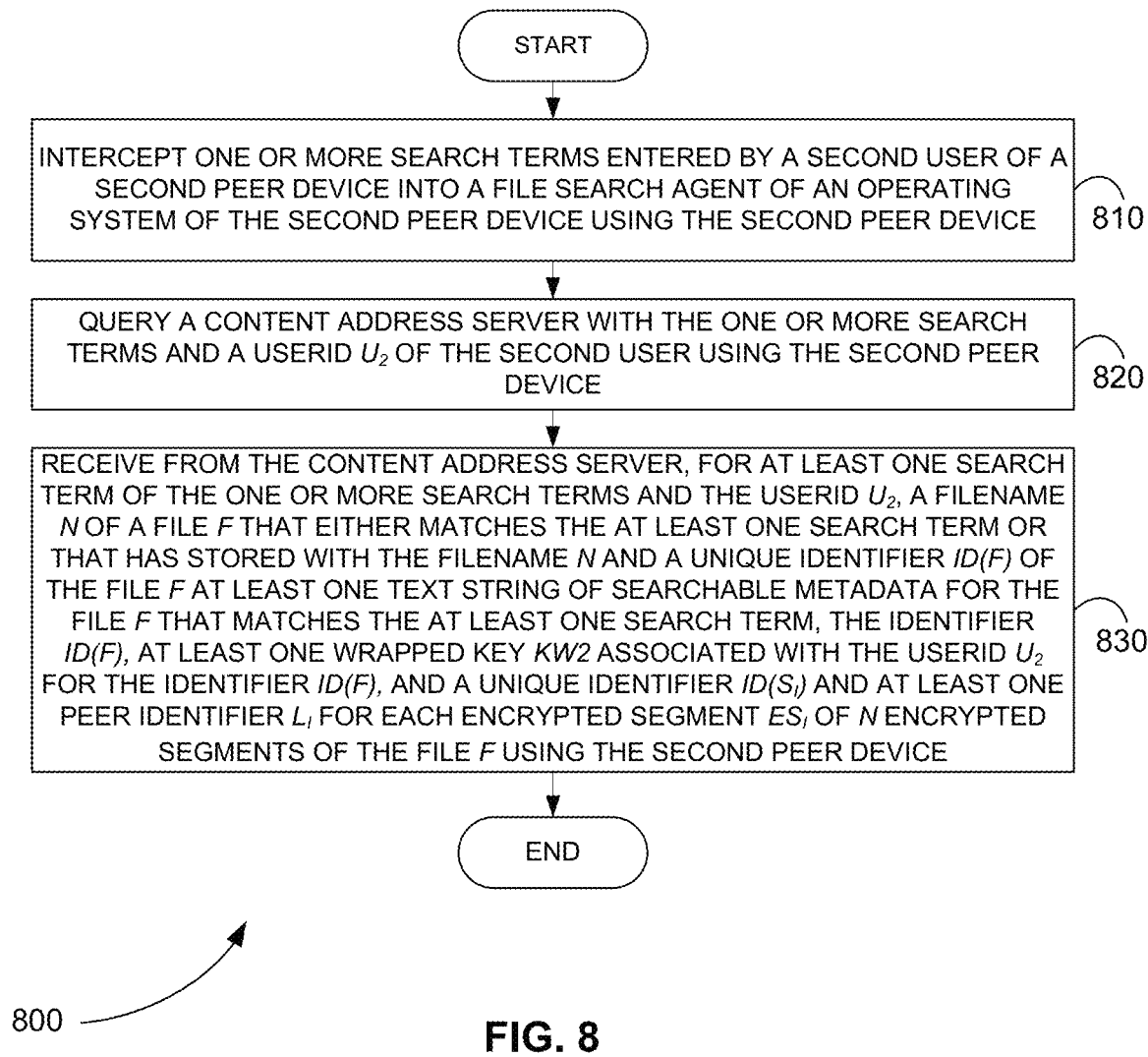
FIG. 8 is a flowchart showing a computer-implemented method for finding a file with metadata matching a search term in a distributed cryptographically secured P2P filesystem, in accordance with various embodiments.

FIG. 8 is a flowchart showing a computer-implemented method 800 for finding a file with metadata matching a search term in a distributed cryptographically secured P2P filesystem, in accordance with various embodiments.

In step 810 of method 800, one or more search terms entered by a second user of a second peer device into a file search agent of an operating system of the second peer device are intercepted using the second peer device.

In step 820, a content address server is queried with the one or more search terms and a userid $u_2$ of the second user using the second peer device.

In step 830, from the content address server, for at least one search term of the one or more search terms and the userid $u_2$, a filename n of a file f is received that matches the at least one search term. Alternatively, a filename n is received that has stored with the filename n and a unique identifier id(f) of the file f at least one text string of searchable metadata for the file f that matches the at least one search term. The identifier id(f), at least one wrapped key KW2 associated with the userid $u_2$ for the identifier id(f), and a unique identifier id(s) and at least one peer identifier $l_i$ for each encrypted segment $es_i$ of n encrypted segments of the file f are received along with the filename n using the second peer device.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A computer-implemented method for sharing a file with searchable metadata among peer devices in a distributed cryptographically secured peer-to-peer filesystem, comprising:

detecting that a first user is saving a file f on a first peer device;

intercepting before storage in a non-volatile memory of the first peer device the file f, a filename fn of the file f, and one or more text strings entered by the first user as searchable metadata for the file f using the first peer device;

generating a unique identifier id(f) for the file f using the first peer device;

storing together the filename fn, the one or more text strings, and the identifier id(f) on a content address server using the first peer device, wherein the storing together the filename fn, the one or more text strings, and the identifier id(f) comprises searching a content address server for previous versions of the file f using the filename fn and the identifier id(f) and generating versioning information for the file f from the search using the first peer device, and storing together the filename fn, the one or more text strings, the versioning information, and the identifier id(f) on the content address server using the first peer device;

generating a symmetric encryption key KF for the file f on the first peer device;

dividing the file f into n segments on the first peer device, where in n>1;

generating a unique identifier $id(s_i)$ for each segment $s_i$ of the n segments on the first peer device;

encrypting each segment $s_i$ of the n segments using the symmetric key KF using a symmetric encryption algorithm on the first peer device, producing n encrypted segments $es_i=ES_{KF}(s_i)$;

storing each encrypted segment $es_i$ of the n segments with its identifier $id(s_i)$ on at least one peer device identified by a unique peer identifier $l_i$ using the first peer device;

for each encrypted segment $es_i$, storing the identifier $id(s_i)$ on the content address server with the identifier id(f) using the first peer device;

retrieving from a public key server a public key KU2 of a second user who can share the file f, encrypting the symmetric key KF with the public key KU2 using an asymmetric encryption algorithm, producing wrapped key KW2=$EA_{KU2}$(KF), and storing the wrapped key KW2 on the content address server with the identifier id(f) using the first peer device.

2. The method of claim 1, wherein the versioning information comprises a date and time of the storage of the file f, a userid of an author of the file f, and an ordinal sequence number of the version.

3. The method of claim 1, wherein the content address server comprises a distributed hash table.

4. The method of claim 3, wherein the identifier id(f) comprises a cryptographic hash value h(f) and is generated using a cryptographic hashing algorithm.

5. The method of claim 3, wherein the unique identifier $id(s_i)$ for each segment $s_i$ of the n segments comprises a cryptographic hash value $h(s_i)$ and is generated using a cryptographic hashing algorithm.

6. The method of claim 1, further comprising sending the identifier id(f) to a second peer device used by the second user using the first peer device.

7. The method of claim 1, wherein storing each encrypted segment $es_i$ of the n segments with its identifier $id(s_i)$ on at least one peer device identified by a unique peer identifier $l_i$ comprises storing each encrypted segment $es_i$ of the n segments with its identifier $id(s_i)$ on the first peer device identified by a unique peer identifier $l_1$.

8. The method of claim 1, wherein storing each segment $es_i$ of the n segments with its identifier $id(s_i)$ on at least one peer device identified by a unique peer identifier $l_i$ comprises storing each segment $es_i$ of the n segments with its identifier $id(s_i)$ on a different peer device identified by a unique peer identifier $l_i$.

9. The method of claim 1, wherein dividing the file f into n segments on the first peer device further comprises using erasure coding so that the encrypted file ef can be reconstructed from m segments of the n segments where 0<m<n.

10. The method of claim 1, further comprising retrieving from the public key server a public key KU1 of the first user, encrypting the symmetric key KF with the public key KU1 using the asymmetric encryption algorithm, producing wrapped key KW1=$EA_{KU1}$(KF), and storing the wrapped key KW1 on the content address server with the identifier id(f) using the first peer device in order to make the file f accessible to the first user.

11. A system for sharing a file with searchable metadata among peer devices in a distributed cryptographically secured peer-to-peer filesystem, comprising:
   a public key server that stores one or more public keys of an asymmetric cryptographic algorithm for one or more users;
   a content address server that stores information about one or more files;
   a first peer device that
      detects that a first user is saving a file f on the first peer device,
      intercepts before storage in a non-volatile memory of the first peer device the file f, a filename fn of the file f, and one or more text strings entered by the first user as searchable metadata for the file f,
      generates a unique identifier id(f) for the file f,
      stores together the filename fn, the one or more text strings, and the identifier id(f) on a content address server, wherein the stores together the filename fn, the one or more text strings, and the identifier id(f) comprises searching a content address server for previous versions of the file f using the filename fn and the identifier id(f) and generating versioning information for the file f from the search using the first peer device, and storing together the filename fn, the one or more text strings, the versioning information, and the identifier id(f) on the content address server using the first peer device,
      generates a symmetric encryption key KF for the file f,
      divides the file f into n segments on the first peer device, wherein n>1,
      generates a unique identifier id(s) for each segment $s_i$ of the n segments on the first peer device;
      encrypts each segment $s_i$ of the n segments using the symmetric key KF using a symmetric encryption algorithm on the first peer device, producing n encrypted segments $es_i = ES_{KF}(s_i)$,
      stores each encrypted segment $es_i$ of the n segments with its identifier $id(s_i)$ on at least one peer device identified by a unique peer identifier $l_i$,
      for each encrypted segment $es_i$, stores the identifier $id(s_i)$ on the content address server with the identifier id(f), and
      retrieves from the public key server a public key KU2 of a second user who can share the file f, encrypts the symmetric key KF with the public key KU2 using an asymmetric encryption algorithm, producing wrapped key $KW2 = EA_{KU2}(KF)$, and stores the wrapped key KW2 on the content address server with the identifier id(f).

12. The system of claim 11, wherein the versioning information comprises a date and time of the storage of the file f, a userid of an author of the file f, and an ordinal sequence number of the version.

\* \* \* \* \*